United States Patent
Zhai et al.

(10) Patent No.: US 11,406,940 B2
(45) Date of Patent: Aug. 9, 2022

(54) METHOD FOR REDUCING MONOVALENT IONS IN CONCENTRATE OF NANOFILTRATION SYSTEM AND THE NANOFILTRATION SYSTEM

(71) Applicant: BL TECHNOLOGIES, INC., Minnetonka, MN (US)

(72) Inventors: Jianwen Zhai, Beijing (CN); Min Luo, Beijing (CN)

(73) Assignee: BL TECHNOLOGIES, INC., Minnetonka, MN (US)

( * ) Notice: Subject to any disclaimer, the term of this patent is extended or adjusted under 35 U.S.C. 154(b) by 13 days.

(21) Appl. No.: 16/498,201

(22) PCT Filed: Mar. 29, 2018

(86) PCT No.: PCT/US2018/025157
§ 371 (c)(1),
(2) Date: Sep. 26, 2019

(87) PCT Pub. No.: WO2018/183687
PCT Pub. Date: Oct. 4, 2018

(65) Prior Publication Data
US 2020/0023317 A1     Jan. 23, 2020

(30) Foreign Application Priority Data
Apr. 1, 2017 (CN) .......................... 201710214188.3

(51) Int. Cl.
*B01D 61/02* (2006.01)
*B01D 61/08* (2006.01)
(Continued)

(52) U.S. Cl.
CPC ......... *B01D 61/022* (2013.01); *B01D 61/027* (2013.01); *B01D 61/08* (2013.01);
(Continued)

(58) Field of Classification Search
CPC ................ B01D 61/022; B01D 61/027; B01D 2311/10; B01D 2311/18; B01D 2317/022; C02F 1/442
See application file for complete search history.

(56) References Cited

U.S. PATENT DOCUMENTS

| 5,958,244 A * | 9/1999 | Hartmann ............ B01D 61/025 |
| | | 210/650 |
| 6,113,797 A * | 9/2000 | Al-Samadi .......... B01D 61/022 |
| | | 210/650 |
| 2008/0230476 A1* | 9/2008 | Gilron .................... B01D 61/10 |
| | | 210/652 |

(Continued)

FOREIGN PATENT DOCUMENTS

| CN | 105026018 A | 11/2015 |
| CN | 205850608 U | 1/2017 |

(Continued)

OTHER PUBLICATIONS

Schaep, Johan, et al. "Removal of hardness from groundwater by nanofiltration." Desalination 119.1-3 (1998): 295-301. (Year: 1998).*

(Continued)

*Primary Examiner* — Bradley R Spies (57) ABSTRACT

This specification describes a method for lowering the content of monovalent ions in a final concentrate of a nanofiltration system relative to a brine and a corresponding nanofiltration system. The nanofiltration system comprises at least three stages of nanofiltration, wherein the concentrate from each segment flows into the next segment. A feed stream is sent into one stage to generate a concentrate stream, and a first portion of the concentrate stream is recirculated to the one stage. The pH of the feed stream is controlled in a range of 2-7. The temperature of the feed stream is in a range of 20-60° C. The feed stream includes the recirculated concentrate stream and at least part of a concentrate generated from an upstream stage. The method and the system described herein can reduce the concentration of monovalent ions in the final concentrate during a nanofiltration separation process.

8 Claims, 3 Drawing Sheets

(51) Int. Cl.
*C02F 1/44* (2006.01)
*C02F 101/12* (2006.01)

(52) U.S. Cl.
CPC .......... *C02F 1/442* (2013.01); *B01D 2311/10* (2013.01); *B01D 2311/18* (2013.01); *B01D 2311/25* (2013.01); *B01D 2317/022* (2013.01); *C02F 2101/12* (2013.01); *C02F 2209/02* (2013.01); *C02F 2209/06* (2013.01); *C02F 2209/40* (2013.01); *C02F 2301/046* (2013.01); *C02F 2301/08* (2013.01)

(56) References Cited

U.S. PATENT DOCUMENTS

| | | | |
|---|---|---|---|
| 2013/0146514 A1* | 6/2013 | Reeves | B01D 61/022 210/106 |
| 2014/0299546 A1* | 10/2014 | Eckert | B01D 61/12 210/651 |
| 2014/0367273 A1 | 12/2014 | Kaczur et al. | |
| 2016/0031726 A1* | 2/2016 | Zhai | C02F 1/44 210/650 |
| 2017/0015692 A1 | 1/2017 | Samec et al. | |

FOREIGN PATENT DOCUMENTS

| | | | | |
|---|---|---|---|---|
| WO | WO-2012175804 | A1 * | 12/2012 | .............. C02F 1/006 |
| WO | 2016209301 | A1 | 12/2016 | |

OTHER PUBLICATIONS

Nilsson, Mattias, Gun Trägårdh, and Karin Östergren. "The influence of pH, salt and temperature on nanofiltration performance." Journal of Membrane Science 312.1-2 (2008): 97-106. (Year: 2008).*
Chinese Patent Application No. 201710214188.3 , Office Action dated Apr. 20, 2021.
Chinese Patent Application No. 201710214188.3 , Office Action dated Jul. 2, 2020.
Peiyuan, Li et al., "Power Plant Water Treatment and Water Quality Control", China Electric Power Press, Sep. 30, 2012, p. 184.
Xiang, Gao et al., "Water Supply Engineering Technology and Engineering Examples", Beijing: Chemical Industry Press, May 31, 2002, p. 219.
Yuzhong, Zhang et al., "Liquid Separation Membrane Technology and Applications", Chemical Industry Press, Jan. 31, 2004, pp. 385-387.
International Application No. PCT/US2018/025157, International Search Report and Written Opinion, dated Jun. 15, 2018.
International Application No. PCT/US2018/025157, International Preliminary Report on Patentability, dated Oct. 10, 2019.
European Application No. 18718347.0, Communication pursuant to Rules 161(1) and 162 EPC dated Nov. 12, 2019.
Chinese Patent Application No. 201710214188.3 , Office Action dated Jul. 30, 2021.

* cited by examiner

METHOD FOR REDUCING MONOVALENT IONS IN CONCENTRATE OF NANOFILTRATION SYSTEM AND THE NANOFILTRATION SYSTEM

CROSS-REFERENCE TO RELATED APPLICATIONS

This application is a National Stage Entry of International Application No. PCT/US2018/025157, filed Mar. 29, 2018, which claims the benefit of Chinese Application Serial No. 201710214188.3, filed Apr. 1, 2017.

FIELD OF THE INVENTION

This specification relates to a nanofiltration system and method. The method and system may be used to produce a final concentrate with a reduced content of monovalent ions relative to a brine being treated.

BACKGROUND

Nanofiltration (NF) is a membrane separation technology between osmosis and ultrafiltration. The cutoff relative molecular weight of a nanofiltration membrane may be between 200 and 2000 and the membrane pore size may be around 1-2 nm. Nanofiltration is suitable for separating dissolved ingredients with a size of about 1 nm. As a result, it is referred to as "nanofiltration" or "nanometer filtration." A nanofiltration membrane can effectively retain bivalent and multi-valent ions and organics with a relative molecular weight greater than 200, while most of monovalent inorganic salts can pass through.

A nanofiltration membrane is typically used in a form of a membrane element, such as a spiral membrane element, a hollow fiber membrane element, or a tubular membrane element. The element may contain one or many individual membranes held together, for example by spacers and collection tubes or headers, in a way that separates a feed side of the membranes from a permeate side of the membranes. A membrane element is the smallest unit of a nanofiltration system that can implement the separation process. Typically, 1 to 8 membrane elements are installed in series in a pressure vessel (or "shell" or "housing") to form a membrane module, alternatively called a membrane component. Each pressure vessel has an inlet, a concentrate outlet and a permeate outlet. One pressure vessel, or multiple membrane pressure vessels connected together in parallel, can form a segment, alternatively called a stage. According to needs, a nanofiltration system is usually divided into a multiple-segment nanofiltration system, also called a multiple-stage nanofiltration system. In some systems the concentrate generated from one segment is supplied as a feed water to the next segment, which is usually referred to as "concentrate staging". The concentrate generated by the last segment is used as the final concentrate of the system, and the permeate streams generated from all segments are gathered together and used as the final permeate of the system. Such a system can achieve a high recovery rate, wherein the recovery rate refers to a percentage of a feed stream that is converted to permeate. On the other hand, a multiple-stage nanofiltration system with permeate staging means that the permeate generated from one stage is used as a feed stream to the next stage. The permeate generated by the last stage can be used as the final permeate of the system, and the concentrates generated from all stages can be gathered together and used as the final concentrate of the system. The goal of permeate staging is to minimize substances to be retained in the final permeate and improve the quality of the final permeate.

A nanofiltration membrane can be used in a salt-separating process for a brine. The salt-separating process includes the separation of organics and bivalent and multi-valent ions from monovalent ions in the brine, wherein the organics and bivalent and multi-valent ions are retained in the final concentrate of the system, and most monovalent ions are concentrated in the final permeate of the system. However, there is often a problem of incomplete separation when a nanofiltration membrane is used to process the brine. Specifically, the content of monovalent ions in the final concentrate of a system is still relatively high.

At present, dilution is used to lower the content of monovalent ions in the final concentrate of a nanofiltration system. In particular, deionized water is fed through an inlet of a stage of a membrane system to dilute the feed stream to the stage, for example as disclosed in US Patent Application US20140299546A1. However, there is still a need for more effective or alternative methods and nanofiltrations to produce a low content of monovalent ions in the final concentrate of a nanofiltration system and to lower the retention rate of monovalent ions by a nanofiltration system.

INTRODUCTION

This specification describes a method for operating a nanofiltration system. The nanofiltration system optionally has at least three segments of nanofiltration membrane modules, wherein the concentrate from each segment flows into the feed inlet of the next segment. The method includes sending a feed stream into one segment of the system to generate a concentrate stream. A first part of the concentrate stream is recirculated to the one segment. The pH value of the feed stream is controlled in a range of 2-7, and the temperature of the feed stream is controlled in a range of 20-60° C. The feed stream to the one unit includes at least one part of an upstream concentrate and the recirculated part of the concentrate stream. The upstream concentrate refers is generated from an upstream segment to the one segment.

This specification also describes a nanofiltration system, optionally with at least three segments of nanofiltration membrane modules. The concentrate from each segment flows into the next segment. A first recirculating pump is connected to one segment of the system and configured to recirculate a first part of a concentrate stream generated by the one segment back to the feed inlet of the one segment. A pH adjustment unit is configured to adjust the pH value of a feed stream to the one segment in a range of 2-7. A temperature control unit is configured to control the temperature of the feed stream to the one segment in a range of 20-60° C. The feed stream to the one segment includes at least one part of an upstream concentrate and the recirculated part of the concentrate stream. The upstream concentrate is generated from an upstream segment to the one segment.

The systems and methods herein may be used to lower the content of monovalent ions in the final concentrate of the nanofiltration system relative to a brine being treated, i.e. to produce a final concentrate with a concentration of monovalent ions that is less than a concentration of monovalent ions in the brine. In some cases, the systems and methods described herein may improve the separation efficiency of a nanofiltration system as between monovalent ions and divalent or other multi-valent ions, for example relative to a system or method with only concentrate staging.

BRIEF DESCRIPTION OF THE FIGURES

The above and other features, aspects and advantages of the present invention will become clearer through the following detailed description with reference to the accompanying drawings. In the accompanying drawings, identical element numerals are used to represent identical parts in all the accompanying drawings, which are described below.

DETAILED DESCRIPTION

Specific implementation manners of the present invention will be described in detail below. Unless otherwise defined, technical terms or scientific terms used herein shall have the usual meaning as understood by a person of ordinary skill in the art. The words "first," "second" or similar terms used herein do not represent any sequence, quantity or importance, and are used only to differentiate different parts or elements. The words "one," "a" or similar terms used herein do not represent a quantity limitation, but indicates the existence of at least one. "Or" and "alternatively" are not exclusive, but indicate the presence of at least one of the items mentioned (e.g. ingredients), and comprise the situation in which a combination of the items mentioned may exist. The words "comprise," "contain," "include," "have," or "possess" and similar terms mean that other items, in addition to the items listed thereafter and equivalents thereof, may also be included.

Language used herein that is approximate may be used in quantitative expressions to indicate that a quantity may be varied to a degree without changing the basic functions. Therefore, numerical values modified by "about," "approximately," "around," etc. are not limited to the exact numerical values themselves. Moreover, in an expression of "from about the first numerical value to the second numerical value," "about" modifies both the first numerical value to the second numerical value at the same time. In some cases, language that is approximate may be related to the precision of a measurement instrument. The numerical values mentioned herein include all numerical values increased one unit by one unit from low to high. Here, it is assumed that any lower value and any higher value are spaced apart by at least two units therebetween.

All numerical values from the minimum value to the maximum value listed herein refer to all numerical values obtained by using one unit as an increment between the minimum value and the maximum value when the minimum value and the maximum value are different by two or more units. For example, regarding numerical values of quantities and processes of components like temperature, air pressure, and time, when we say 1 to 90, we mean, for example, enumerated numerical values from 15 to 85, 22 to 68, 43 to 51, 30 to 32, and the like. When a numerical value is less than 1, one unit may be 0.0001, 0.001, 0.01, or 0.1. Only special examples are used herein as an explanation. Numbers listed herein refer to all possible combinations of numerical values between the minimum value and the maximum value obtained by using a similar method.

The embodiments of the present invention relate to a method, useful for example for lowering the content of monovalent ions in a final concentrate of a nanofiltration system, and a nanofiltration system. The embodiments of the present invention can be used to, but are not limited to, process a brine to separate bivalent and other multi-valent ions from monovalent ions in the brine, wherein most of the bivalent and other multi-valent ions are retained in a final concentrate of the nanofiltration system and most of the monovalent ions are retained in a final permeate of the nanofiltration system. In some embodiments, when a brine contains organics, most of the organics with a relative molecular weight greater than 200 are also retained in the final concentrate of the nanofiltration system. The "brine" herein may be an aqueous solution that contains dissolved salts (optionally including both inorganic salts and organic salts), for example, containing sodium chloride (NaCl) and sodium sulfate ($Na_2SO_4$). The brine may be, for example, from a wastewater flow in an industrial process, such as a coal chemical industrial process, or may be a reverse osmosis concentrated water generated in a water treatment process, underground brine, or a waste brine generated by a desalination process.

In a typical process of a nanofiltration system to process a brine, there is still a large quantity of monovalent ions in a final concentrate of the nanofiltration system. To help lower the content of monovalent ions in the final concentrate of the nanofiltration system or achieve more thorough separation, the embodiments of the present invention propose a method and a corresponding nanofiltration system.

According to one aspect, the embodiments of the present invention relate to a nanofiltration system, comprising: at least three segments of nanofiltration membrane components, wherein the concentrate from each segment flows into the next segment; a first recirculating pump connected to one segment thereof and configured to recirculate a first part of a concentrate stream generated by the one segment thereof to the one segment thereof; a pH adjustment unit configured to adjust the pH value of a feed liquid to the one segment thereof in a range of 2-7, and optionally, to adjust the pH value in a range of 3-7; and a temperature control unit configured to control the temperature of the feed liquid to the one segment thereof in a range of 20-60° C., and optionally, to control the temperature in a range of 20-50° C., the temperature control unit usually being a heat exchanger, wherein the feed liquid to the one segment thereof comprises at least one part of an upstream concentrate and the first part of the concentrate stream, and the upstream concentrate refers to a concentrate generated from an upstream segment to the one segment thereof.

Optionally, the one segment thereof is the last segment of the nanofiltration system, and the upstream segment is the second segment from the end.

In some manners of implementation, the nanofiltration system further comprises a deionized water flow supply unit configured to feed a deionized water flow to the one segment thereof. In such a case, the feed liquid to the one segment thereof further comprises the deionized water flow, and the deionized water flow is used to dilute the feed liquid.

In some manners of implementation, all upstream concentrate is fed to the one segment thereof. While in some other implementation manners, the nanofiltration system further comprises a second recirculating pump connected to the upstream segment and configured to recirculate a first part of the upstream concentrate to the upstream segment. In such a case, the upstream concentrate is divided into two parts with the first part recirculated to the upstream segment and a second part fed to the one segment thereof.

Figure 1:
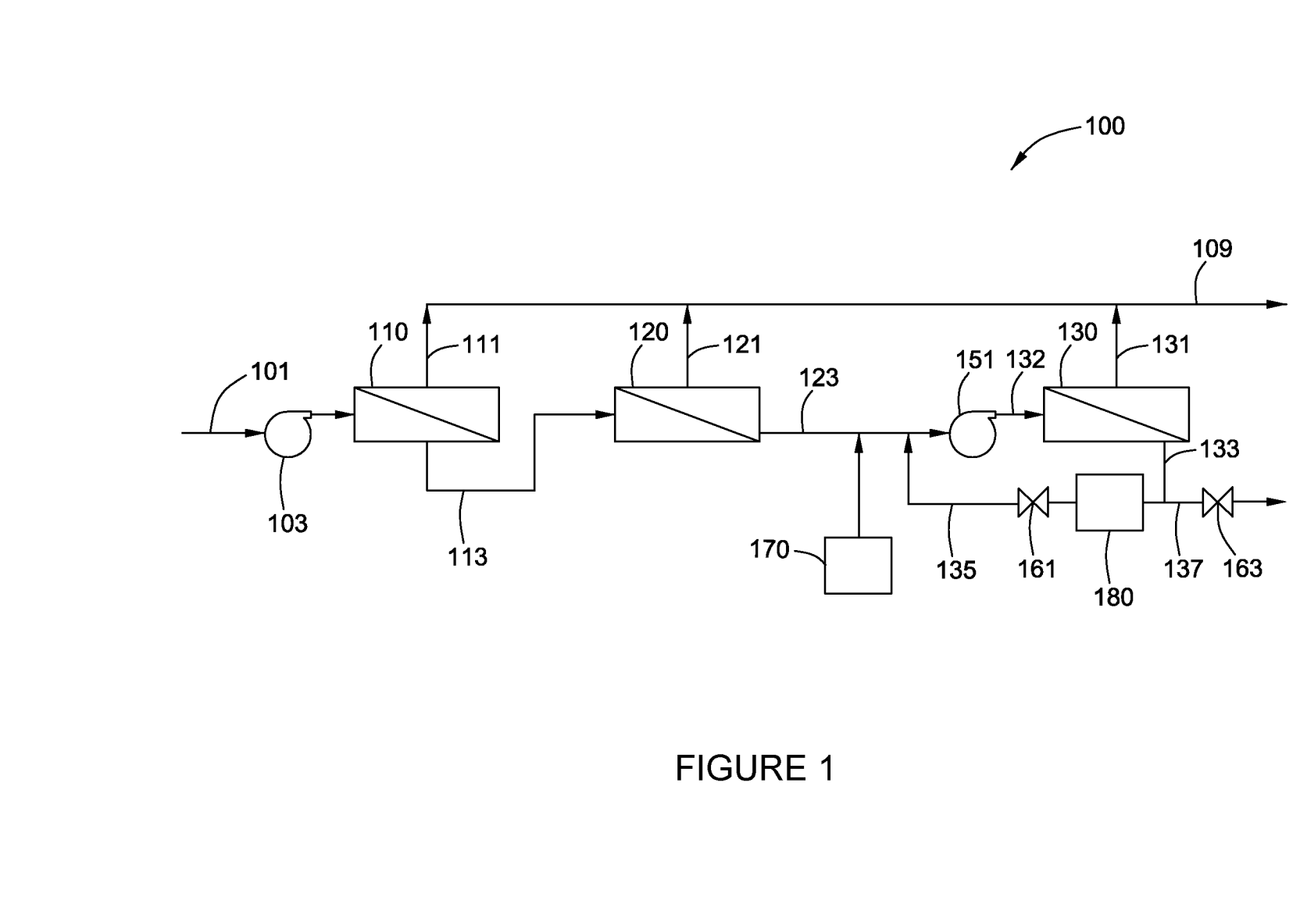
FIG. 1 is a schematic diagram of a nanofiltration system 100 in a first embodiment of the present invention.

FIG. 1 is a schematic diagram of a nanofiltration system 100 in a first embodiment, which is used to process a feed liquid 101. As shown in FIG. 1, the nanofiltration system 100 comprises three segments of nanofiltration membrane components, 110, 120, and 130, a recirculating pump 151, a pH adjustment unit 170, and a heat exchanger 180.

The first segment 110 receives the feed liquid 101; optionally, a booster pump 103 increases the pressure of the feed liquid 101 and then feeds it into the first segment 110, and the first segment 110 processes the feed liquid 101 to obtain a first permeate 111 and a first concentrate 113; the second segment 120 receives and processes the first concentrate 113 to obtain a second permeate 121 and a second concentrate 123.

The third segment 130 receives and processes the feed liquid 132 to obtain a third permeate 131 and a third concentrate 133. The recirculating pump 151 is configured to recirculate a first part 135 of the third concentrate 133 to the third segment 130, and in this way, the feed liquid 132 to the third segment 130 comprises the second concentrate 123 and the first part 135 of the third concentrate 133. Optionally, the nanofiltration system 100 further comprises a valve 161 configured to control the flow rate of the first part 135 of the third concentrate 133, thereby adjusting the recirculation rate of the third segment 130. A second part 137 of the third concentrate 133 is discharged as the final concentrate of the system 100. Optionally, the nanofiltration system 100 further comprises a valve 163 configured to control the flow rate of the second part 137 of the third concentrate 133. The first permeate 111, the second permeate 121, and the third permeate 131 are gathered together and discharged as the final permeate 109 of the system 100.

The pH adjustment unit 170 is configured to inject an acid solution into the second concentrate 123, thereby adjusting the feed liquid 132 to the third segment 130 to be acidic, and specifically adjusting the pH value of the feed liquid 132 in a range of 2-7, and optionally, adjusting the pH value in a range of 3-7.

The heat exchanger 180 is connected to a pipeline through which the first part 135 of the third concentrate 133 flows and configured to heat the water flow therein, thereby controlling the temperature of the feed liquid 132 to the third segment 130 in a range of 20-60° C., and optionally, controlling the temperature in a range of 20-50° C.

Figure 2:
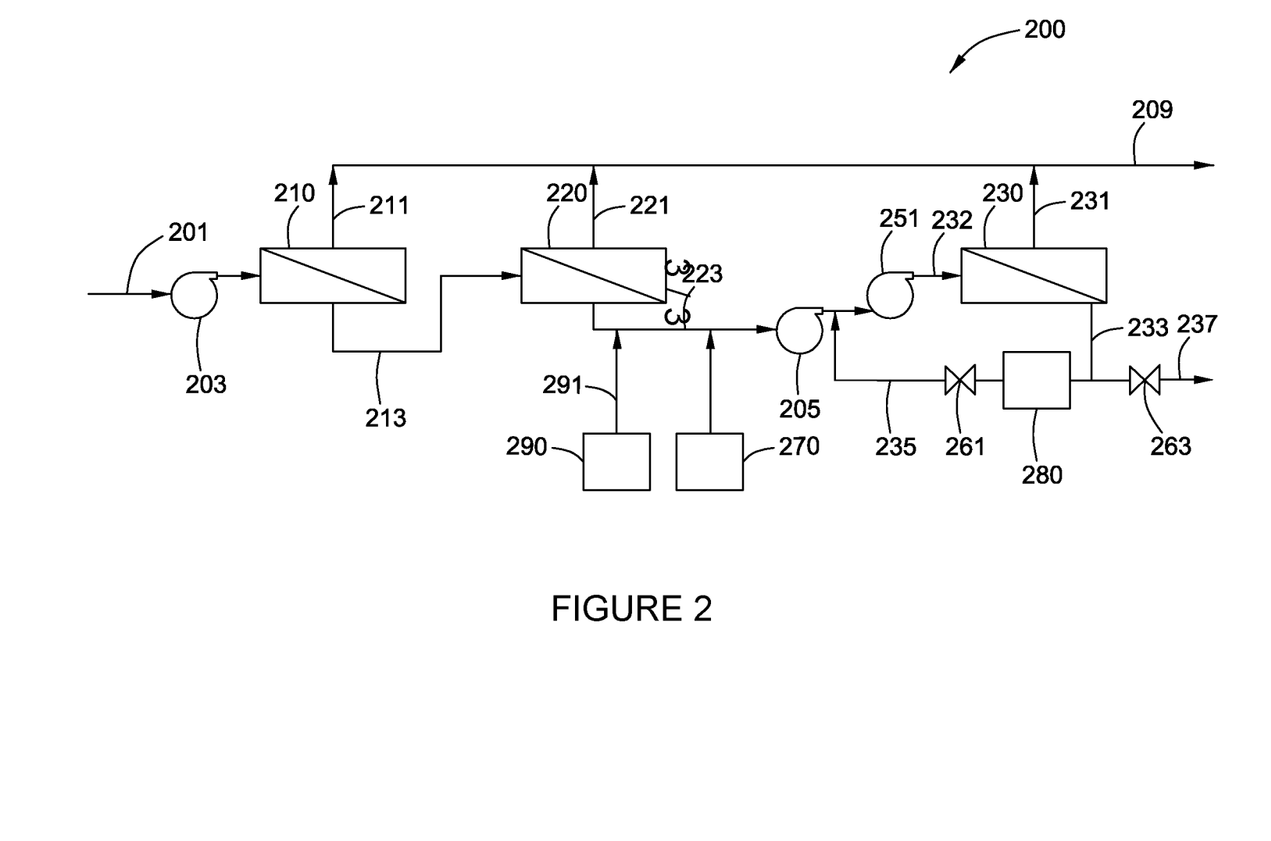
FIG. 2 is a schematic diagram of a nanofiltration system 200 in a second embodiment of the present invention.

FIG. 2 is a schematic diagram of a nanofiltration system 200 in a second embodiment, which is used to process a feed liquid 201. As shown in FIG. 2 and similar to the nanofiltration system 100 in FIG. 1, the nanofiltration system 200 comprises three segments of nanofiltration membrane components, 210, 220, and 230, a recirculating pump 251, a pH adjustment unit 270, and a heat exchanger 280. Unlike the nanofiltration system 100, the nanofiltration system 200 further comprises a deionized water flow supply unit 290.

The first segment 210 receives the feed liquid 201; optionally, a booster pump 203 increases the pressure of the feed liquid 201 and then feeds it into the first segment 210, and the first segment 210 processes the feed liquid 201 to obtain a first permeate 211 and a first concentrate 213; the second segment 220 receives and processes the first concentrate 213 to obtain a second permeate 221 and a second concentrate 223.

The third segment 230 receives and processes the feed liquid 232 to obtain a third permeate 231 and a third concentrate 233. The recirculating pump 251 is configured to recirculate a first part 235 of the third concentrate 233 to the third segment 230, and optionally, the nanofiltration system 200 further comprises a valve 261 configured to control the flow rate of the first part 235 of the third concentrate 233, thereby adjusting the recirculation rate of the third segment 230. A second part 237 of the third concentrate 233 is discharged as the final concentrate of the system 200. Optionally, the nanofiltration system 200 further comprises a valve 263 configured to control the flow rate of the second part 237 of the third concentrate 233. The first permeate 211, the second permeate 221, and the third permeate 231 are gathered together and discharged as the final permeate 209 of the system 200.

The deionized water flow supply unit 290 is configured to feed a deionized water flow 291 to a pipeline through which the second concentrate 223 flows and dilute the second concentrate 223. In this way, feed liquid 232 to the third segment 230 comprises the second concentrate 223, the deionized water flow 291, and the first part 235 of the third concentrate 233. Optionally, the nanofiltration system 200 further comprises a booster pump 205 configured to increase the pressure of the second concentrate 223 and deionized water flow 291 and then feed them into the third segment 230.

The pH adjustment unit 270 is configured to inject an acid solution into the second concentrate 223, thereby adjusting the feed liquid 232 to the third segment 230 to be acidic, and specifically adjusting the pH value of the feed liquid 232 in a range of 2-7, and optionally, adjusting the pH value in a range of 3-7.

The heat exchanger 280 is connected to a pipeline through which the first part 235 of the third concentrate 233 flows and is configured to heat the water flow therein, thereby controlling the temperature of the feed liquid 232 to the third segment 230 in a range of 20-60° C., and optionally, controlling the temperature in a range of 20-50° C.

Figure 3:
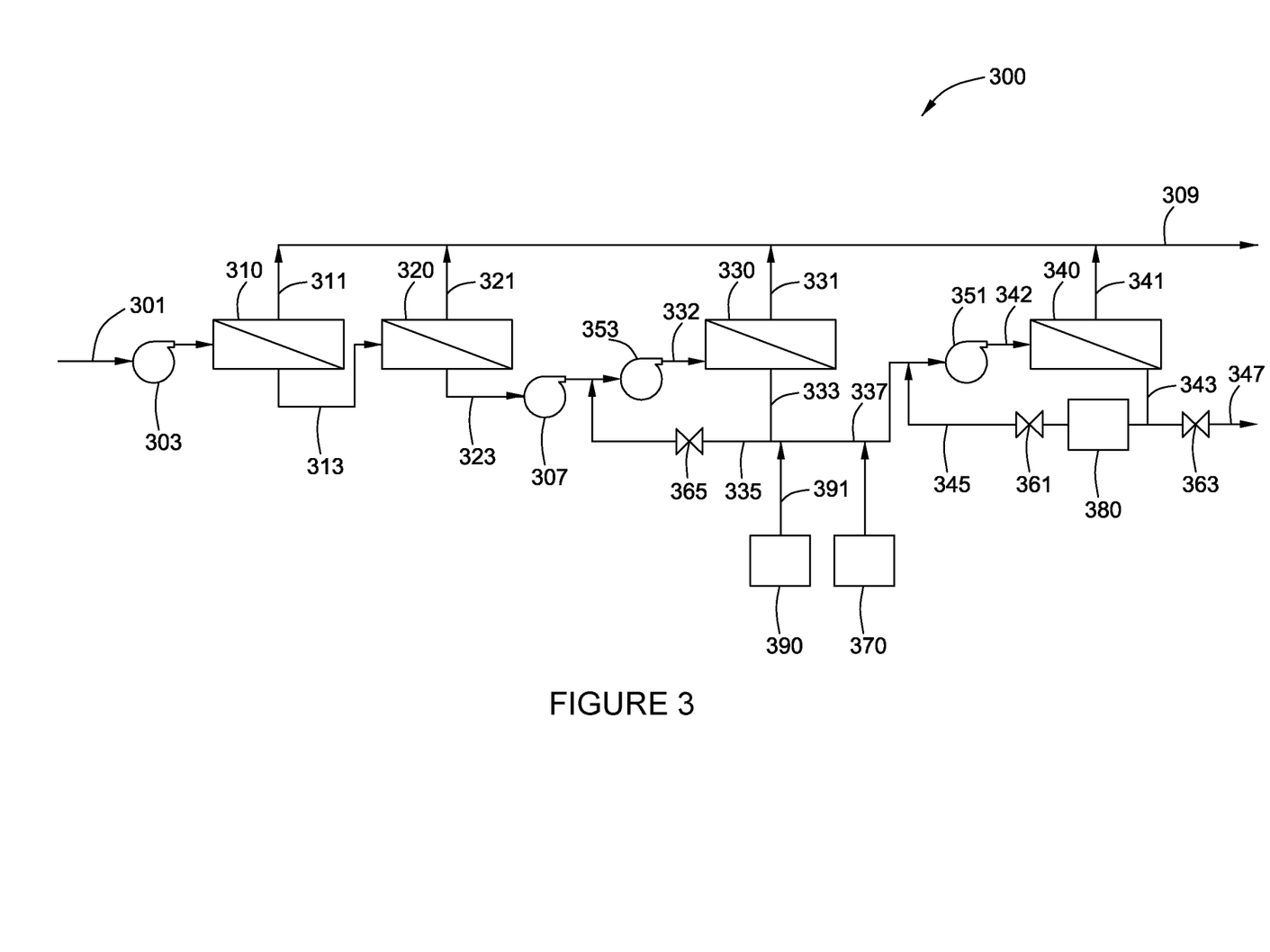
FIG. 3 is a schematic diagram of a nanofiltration system 300 in a third embodiment of the present invention.

FIG. 3 is a schematic diagram of a nanofiltration system 300 in a third embodiment, which is used to process a feed liquid 301. As shown in FIG. 3 and unlike the nanofiltration system 100 in FIG. 1 and the nanofiltration system 200 in FIG. 2 that each comprise three segments of nanofiltration membrane components, the nanofiltration system 300 comprises four segments of nanofiltration membrane components, 310, 320, 330, and 340; moreover, the nanofiltration system 300 further comprises recirculating pumps 351 and 353, a pH adjustment unit 370, a heat exchanger 380, and a deionized water flow supply unit 390.

The first segment 310 receives the feed liquid 301; optionally, a booster pump 303 increases the pressure of the feed liquid 301 and then feeds it into the first segment 310, and the first segment 310 processes the feed liquid 301 to obtain a first permeate 311 and a first concentrate 313; the second segment 320 receives and processes the first concentrate 313 to obtain a second permeate 321 and a second concentrate 323; the second concentrate 323 is fed to the third segment 330, and optionally, a booster pump 307 increases the pressure of the second concentrate 323 and then feeds it to the third segment 330.

The third segment 330 receives and processes the feed liquid 332 to obtain a third permeate 331 and a third concentrate 333. The recirculating pump 353 is configured to recirculate a first part 335 of the third concentrate 333 to the third segment 330, and in this way, the feed liquid 332 not only comprises the second concentrate 323, but also comprises the first part 335 of the third concentrate 333. Optionally, the nanofiltration system 300 further comprises a valve 365 configured to control the flow rate of the first part 335 of the third concentrate 333, thereby adjusting the recirculation rate of the third segment 330. A second part 337 of the third concentrate 333 is fed to the fourth segment 340.

The deionized water flow supply unit 390 is configured to feed a deionized water flow 391 to a pipeline through which the second part 337 of the third concentrate 333 flows and dilute the second part.

The fourth segment 340, i.e. the last segment receives and processes a feed liquid 342 to obtain a fourth permeate 341 and a fourth concentrate 343. The recirculating pump 351 is configured to recirculate a first part 345 of the fourth concentrate 343 to the fourth segment 340, and in this way, the feed liquid 342 comprises a second part 337 of the third concentrate 333, the deionized water flow 391, and the first part 345 of the fourth concentrate 343. Optionally, the nanofiltration system 300 further comprises a valve 361 configured to control the flow rate of the first part 345 of the fourth concentrate 343, thereby adjusting the recirculation rate of the fourth segment 340. A second part 347 of the fourth concentrate 343 is discharged as the final concentrate of the system 300. Optionally, the nanofiltration system 300 further comprises a valve 363 configured to control the flow rate of the second part 347 of the fourth concentrate 343. The first permeate 311, the second permeate 321, the third permeate 331 and the fourth permeate 341 are gathered together and discharged as the final permeate 309 of the system 300.

The pH adjustment unit 370 is configured to inject an acid solution into the second part 337 of the third concentrate 333, thereby adjusting the feed liquid 342 to the fourth segment 340 to be acidic, and specifically adjusting the pH value of the feed liquid 342 in a range of 2-7, and optionally, adjusting the pH value in a range of 3-7.

The heat exchanger 380 is connected to a pipeline through which the first part 345 of the fourth concentrate 343 flows and configured to heat the water flow therein, thereby controlling the temperature of the feed liquid to the fourth segment 340 in a range of 20-60° C., and optionally, controlling the temperature in a range of 20-50° C.

According to another aspect, the embodiments of the present invention further relate to a method for operating a nanofiltration system, the nanofiltration system comprising at least three segments of nanofiltration membrane components, wherein the concentrate from each segment flows into the next segment, and the method comprises: sending a feed liquid into one segment thereof to generate a concentrate stream; recirculating a first part of the concentrate stream to the one segment thereof; controlling the pH value of the feed liquid in a range of 2-7, and optionally, controlling the pH value in a range of 3-7; and controlling the temperature of the feed liquid in a range of 20-60° C., and optionally, controlling the temperature in a range of 20-50° C., wherein the feed liquid comprises at least one part of an upstream concentrate and the first part of the concentrate stream, and the upstream concentrate refers to a concentrate generated from an upstream segment to the one segment thereof. Optionally, the one segment thereof is the last segment of the nanofiltration system, and the upstream segment is the second segment from the end. The method may be used for lowering the content of monovalent ions in a final concentrate relative to a brine being treated.

In some implementation manners, it is preferable to control the recirculation rate of a recirculating operation to be greater than 2, and optionally greater than 5. The recirculation rate herein refers to a ratio, in a feed liquid to a segment of nanofiltration membrane component, of the flow rate of a recirculated water flow from the same segment to the flow rate of a water flow from the upstream. With the nanofiltration system 100 in FIG. 1 as an example, the recirculation rate of the third segment 130 is a ratio of the flow rate of the first part 135 of the third concentrate 133 to the flow rate of the second concentrate 123.

In some manners of implementation, a feed liquid further comprises a deionized water flow, which is embodied in operation by feeding a deionized water flow as a part of a feed liquid to the one segment thereof for the purpose of dilution. Specifically, the deionized water flow may be fed to and mixed with a part of the upstream concentrate that is fed to the one segment thereof, or the deionized water flow may be fed to and mixed with the recirculated first part of the concentrate stream. Alternatively, the deionized water flow is directly fed to an inlet of the one segment thereof. In some implementation manners, the flow rate of the deionized water flow is controlled to be 20%-300%, optionally 40%-150%, of the flow rate of the part of the upstream concentrate that needs to be fed to the one segment thereof. The flow rate is usually represented by a flow rate of a liquid, such as the number of cubic meters per hour and the unit is m³/h. With the nanofiltration system 200 in FIG. 2 as an example, the deionized water flow supply unit 290 feeds a deionized water flow 291 to a pipeline through which the second concentrate 223 flows, dilutes the second concentrate 223, and then feeds it to the third segment 230. The recirculation rate of the third segment 230 is a ratio of the flow rate of the first part 235 of the third concentrate 233 to the total flow rate of the second concentrate 223 and the deionized water flow 291.

In some manners of implementation, it is preferable to control the flux of a segment comprising a recirculating operation to be less than 20 L/m²·h, and optionally less than 15 L/m²·h. The segment comprising a recirculating operation is, for example, the third segment in the nanofiltration system 100 in FIG. 1, the third segment in the nanofiltration system 200 in FIG. 2, and the third segment and the fourth segment in the nanofiltration system 300 in FIG. 3. Here, the flux means the flow rate of a permeate per unit membrane area and is usually measured in liters per square meter per hour.

In some manners of implementation, the method according to the present invention further comprises: recirculating the first part of the upstream concentrate to the upstream segment, namely carrying out a recirculating operation in the upstream segment as well. See the above description of the nanofiltration system 300 shown in FIG. 3 for an example of this method. In the nanofiltration system 300, a recirculating operation is carried out in the fourth segment 340, i.e. the last segment, and a recirculating operation is also carried out in the third segment 330, i.e. the second segment from the end.

In the method and the nanofiltration system according to the present invention, by controlling the feed liquid concentration, pH value range and temperature range of at least one segment, and optionally each segment, of the nanofiltration system, optionally as well as the flux and recirculation amount of at least one segment or optionally each segment, the retention of monovalent ions by the nanofiltration system can be reduced, or the concentration of monovalent ions in the final concentration can be lowered, and the effect of separation of monovalent ions from bivalent and other multi-valent ions and optionally other organics can be improved.

Example 1

In Example 1, the nanofiltration system 100 shown in FIG. 1 is used to process a brine containing sodium chloride and sodium sulfate. The concentrations of sodium chloride and sodium sulfate in the brine are 10 g/L and 18 g/L, respectively. The brine is introduced into the nanofiltration system 100 at a flow rate of 100 m³/h. The specific operating parameters are listed in Table 1.

TABLE 1

| | | Flow rate (m³/h) | Recirculation rate (m³/h) | DI water flow rate (m³/h) | Flux (L/m²·h) | pH | Temp (°C.) | NaCl (g/L) | Na₂SO₄ (g/L) | SO₄/Cl |
|---|---|---|---|---|---|---|---|---|---|---|
| 1st segment | Feed liquid | 100 | 0 | 0 | / | 7 | 25 | 10 | 18 | 0.74 |
| | Permeate | 52.8 | | | 22 | / | / | 11 | 0.3 | / |
| | Concentrate | 47.2 | | | / | / | / | 8.9 | 38 | / |
| 2nd segment | Feed liquid | 47.2 | 0 | 0 | / | 7 | 25 | 8.9 | 38 | 1.7 |
| | Permeate | 21 | | | 19 | / | / | 11 | 0.5 | / |
| | Concentrate | 26.2 | | | / | / | / | 7.2 | 68.1 | 3.9 |
| 3rd segment | Feed liquid | 61.2 | 35 | 0 | / | 5.5 | 35 | 4.8 | 124 | 10.6 |
| | Permeate | 16.2 | | | 13 | / | / | 9.1 | 1.5 | / |
| | Concentrate | 45 | | | / | / | / | 4.0 | 175.9 | 18 |
| Final concentrate | | 10 | / | / | / | / | / | 4.0 | 175.9 | 18 |

It can be obtained from Table 1 that the content of sodium chloride in the feed liquid is 10 g/L, while the content of sodium chloride in the final concentrate is 4 g/L. The content of sodium chloride in the final concentrate is lower.

It can be obtained from Table 2 that the content of sodium chloride in the feed liquid is 10 g/L, while the content of sodium chloride in the final concentrate is 4 g/L. The content of sodium chloride in the final concentrate is lower.

Example 2

In Example 2, the nanofiltration system 200 shown in FIG. 2 is used to process a brine containing sodium chloride and sodium sulfate. The concentrations of sodium chloride and sodium sulfate in the brine are 10 g/L and 10 g/L, respectively. The brine is introduced into the nanofiltration system 200 at a flow rate of 100 m³/h. The specific operating parameters are listed in Table 2.

Example 3

In Example 3, the nanofiltration system 300 shown in FIG. 3 is used to process a brine containing sodium chloride and sodium sulfate. The concentrations of sodium chloride and sodium sulfate in the brine are 10 g/L and 10 g/L, respectively. The brine is introduced into the nanofiltration system 300 at a flow rate of 100 m³/h. The specific operating parameters are listed in Table 3.

TABLE 2

| | | Flow rate (m³/h) | Recirculation rate (m³/h) | DI water flow rate (m³/h) | Flux (L/m²·h) | pH | Temp (°C.) | NaCl (g/L) | Na₂SO₄ (g/L) | SO₄/Cl |
|---|---|---|---|---|---|---|---|---|---|---|
| 1st segment | Feed liquid | 100 | 0 | 0 | / | 7 | 25 | 10 | 10 | 0.41 |
| | Permeate | 52.8 | | | 22 | / | / | 10 | 0.1 | / |
| | Concentrate | 47.2 | | | / | / | / | 10 | 21 | / |
| 2nd segment | Feed liquid | 47.2 | 0 | 0 | / | 7 | 25 | 10 | 21 | 0.86 |
| | Permeate | 21 | | | 19 | / | / | 11.5 | 0.3 | / |
| | Concentrate | 26.2 | | | / | / | / | 8.8 | 37.6 | 1.7 |
| 3rd segment | Feed liquid | 71.2 | 35 | 10 | / | 4.5 | 35 | 6.6 | 60 | 3.7 |
| | Permeate | 28.2 | | | 11 | / | / | 7.0 | 1.5 | / |
| | Concentrate | 43 | | | / | / | / | 4.0 | 117.8 | 12 |
| Final concentrate | | 8 | / | / | / | / | / | 4.0 | 117.8 | 12 |

TABLE 3

| | | Flow rate (m³/h) | Recirculation rate (m³/h) | DI water flow rate (m³/h) | Flux (L/m²·h) | pH | Temp (° C.) | NaCl (g/L) | Na$_2$SO$_4$ (g/L) | SO$_4$/Cl |
|---|---|---|---|---|---|---|---|---|---|---|
| 1$^{st}$ segment | Feed liquid | 100 | 0 | 0 | / | 7 | 25 | 10 | 10 | 0.41 |
| | Permeate | 52.8 | | | 22 | / | / | 10 | 0.1 | / |
| | Concentrate | 47.2 | | | / | / | / | 10 | 21 | / |
| 2$^{nd}$ segment | Feed liquid | 47.2 | 0 | 0 | / | 7 | 25 | 10 | 21 | 0.86 |
| | Permeate | 21 | | | 19 | / | / | 11.5 | 0.3 | / |
| | Concentrate | 26.2 | | | / | / | / | 8.8 | 37.6 | 1.7 |
| 3$^{rd}$ segment | Feed liquid | 61.2 | 35 | 0 | / | 7 | 25 | 6.6 | 60 | 3.7 |
| | Permeate | 18.2 | | | 13 | / | / | 10.5 | 1.5 | / |
| | Concentrate | 43 | | | / | / | / | 5.0 | 119.7 | 9.8 |
| 4$^{th}$ segment | Feed liquid | 48 | 32 | 8 | / | 4.5 | 35 | 1.6 | 60 | 15 |
| | Permeate | 8 | | | 10 | / | / | 3.7 | 1.5 | / |
| | Concentrate | 40 | | | / | / | / | 1.3 | 118.2 | 37.1 |
| Final concentrate | | 8 | / | / | / | / | / | 1.3 | 118.2 | 37.1 |

It can be obtained from Table 3 that the content of sodium chloride in the feed liquid is 10 g/L, while the content of sodium chloride in the final concentrate is 1.3 g/L. The content of sodium chloride in the final concentrate is lower.

In this description, the invention is described with reference to specific embodiments, which can help anyone familiar with the process of the present invention conduct experimental operations. These operations include the use of any device or system and the use of any embodied method. The patented scope of the present invention shall be defined by the claims and may include other examples possible in the art. If the other examples are not different from the written language of the claims, or if they are equivalent to what is described in the claims, they shall all be encompassed by the claims of the present invention.

We claim:

1. A method for operating a nanofiltration system, the nanofiltration system comprising at least three stages of nanofiltration with concentrate staging between the stages, the method comprising:

introducing a feed liquid to one stage and producing a concentrate;

recirculating a first portion of the concentrate to the one stage;

controlling the feed liquid in a pH range of 2 to 7 and a temperature range of 20° C. to 60° C., and, controlling a permeate flux of the nanofiltration system to be 20 L/m²·h or less wherein the feed liquid comprises at least part of a previous concentrate produced by a previous stage and the first portion of the concentrate and wherein the recirculating is carried out with a recirculation rate of about 1 or more.

2. The method of claim 1, further comprising:

recirculating a first portion of the previous concentrate to the previous stage.

3. The method of claim 1, wherein the one stage is the last stage, and the previous stage is the last but one stage.

4. The method of claim 1, wherein the feed stream is controlled in a pH range of 3 to 7 and a temperature range of 20° C. to 50° C.

5. The method of claim 1, wherein the recirculation rate is 2 or more.

6. The method of claim 1, wherein the recirculation rate is 5 or more.

7. The method of claim 1, wherein the feed liquid further comprises a deionized water stream.

8. The method of claim 7, further comprising:

controlling a flow rate of the deionized water stream to be 20% to 300% of a flow rate of the at least part of the previous concentrate.

\* \* \* \* \*